US008879728B2

(12) United States Patent
MacMillan et al.

(10) Patent No.: US 8,879,728 B2
(45) Date of Patent: Nov. 4, 2014

(54) KEY CREATION AND ROTATION FOR DATA ENCRYPTION

(71) Applicant: Dark Matter Labs Inc., Victoria (CA)

(72) Inventors: Jeffrey Earl MacMillan, Victoria (CA); Jason Arthur Offrey, Riverview (CA)

(73) Assignee: Dark Matter Labs Inc., Victoria, British Columbia (CA)

( * ) Notice: Subject to any disclaimer, the term of this patent is extended or adjusted under 35 U.S.C. 154(b) by 33 days.

(21) Appl. No.: 13/858,841

(22) Filed: Apr. 8, 2013

(65) Prior Publication Data

US 2014/0177829 A1    Jun. 26, 2014

Related U.S. Application Data

(63) Continuation of application No. 13/708,535, filed on Dec. 7, 2012.

(60) Provisional application No. 61/568,440, filed on Dec. 8, 2011.

(51) Int. Cl.
*H04L 9/00* (2006.01)
*H04L 9/08* (2006.01)
*G06F 21/62* (2013.01)

(52) U.S. Cl.
CPC ............ *H04L 9/0891* (2013.01); *H04L 9/0838* (2013.01); *H04L 9/0861* (2013.01); *G06F 2221/2107* (2013.01); *G06F 21/6218* (2013.01)
USPC ................ 380/45; 380/44; 380/277; 713/165

(58) Field of Classification Search
None
See application file for complete search history.

(56) References Cited

U.S. PATENT DOCUMENTS

| 6,987,853 B2 | 1/2006 | Uner |
| 8,139,770 B2 | 3/2012 | Zheng et al. |
| 8,295,492 B2 | 10/2012 | Suarez et al. |

(Continued)

FOREIGN PATENT DOCUMENTS

| WO | 02/073861 A2 | 9/2002 |
| WO | 2009/154968 A2 | 12/2009 |

OTHER PUBLICATIONS

International Search Report and Written Opinion for International Patent Application No. PCT/IB2012/002637 mailed May 7, 2013.

(Continued)

*Primary Examiner* — Alexander Lagor
(74) *Attorney, Agent, or Firm* — Frommer Lawrence & Haug LLP; John W. Branch

(57) ABSTRACT

Embodiments are directed towards enabling cryptographic key rotation without disrupting cryptographic operations. If key rotation is initiated, a transitional key may be generated by encrypting the current key with a built-in system key. A new key may be generated based one at least one determined key parameter. Next, the new key may be activated by the one or more key holders. If the new key is activated, it may be designated as the new current key. The new current key may be employed to encrypt the transitional key and store it in a key array. Each additional rotated key may be stored in the key array after it is encrypted by the current cryptographic key. Further, in response to a submission of an unencrypted query value, one or more encrypted values that correspond to a determined number of rotated cryptographic keys are generated.

26 Claims, 10 Drawing Sheets

(56) References Cited

U.S. PATENT DOCUMENTS

| | | |
|---|---|---|
| 2001/0056541 A1* | 12/2001 | Matsuzaki et al. ............ 713/193 |
| 2006/0177056 A1 | 8/2006 | Rostin et al. |
| 2006/0179309 A1* | 8/2006 | Cross et al. .................. 713/168 |
| 2008/0301445 A1 | 12/2008 | Vasic et al. |
| 2011/0135093 A1 | 6/2011 | Radatti |
| 2012/0303961 A1 | 11/2012 | Kean et al. |
| 2013/0054967 A1 | 2/2013 | Davoust et al. |

OTHER PUBLICATIONS

Official Communication for U.S. Appl. No. 13/831,618 mailed Jul. 19, 2013.

International Search Report and Written Opinion for International Patent Application No. PCT/IB2013/001386 mailed Sep. 24, 2013.

Official Communication for U.S. Appl. No. 13/708,535 mailed Jan. 17, 2014.

\* cited by examiner

KEY CREATION AND ROTATION FOR DATA ENCRYPTION

CROSS-REFERENCE TO RELATED APPLICATIONS

This application is a continuation patent application of patent application Ser. No. 13/708,535 filed on Dec. 7, 2012, which claims priority under 35 U.S.C. §119(e) of U.S. Provisional Patent Application Ser. No. 61/568,440 filed on Dec. 8, 2011. The present application is entitled to the earlier filing date of patent application Ser. No. 13/708,535 which is hereby claimed under 35 U.S.C. §120 and 35 C.F.R. §1.78 and which is incorporated herein by reference.

TECHNICAL FIELD

The present invention relates generally to computer automated cryptography for non-volatile and volatile data and more particularly, but not exclusively to cryptographic operations directed at cryptographic key creation and cryptographic key rotation.

BACKGROUND

The growth of computer based applications that collect, generate or distribute sensitive data has resulted in the electronic distribution and storage of sensitive information. It is important the sensitive data stored and/or exchanged between computing systems be kept secure from unauthorized access. In many computing environments data encryption may be used to secure sensitive data and/or hide sensitive communications. In some cases, encryption and decryption of data transmitted between authorized users may use encryption methods that use cryptographic keys. One practice that may help maintain improved data security is to frequently change, or rotate, the cryptographic keys. Thus, it is with respect to these considerations and others that the present invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified. For a better understanding of the present invention, reference will be made to the following Description of the Various Embodiments, which is to be read in association with the accompanying drawings, wherein.

DESCRIPTION OF THE VARIOUS EMBODIMENTS

Figure 1:
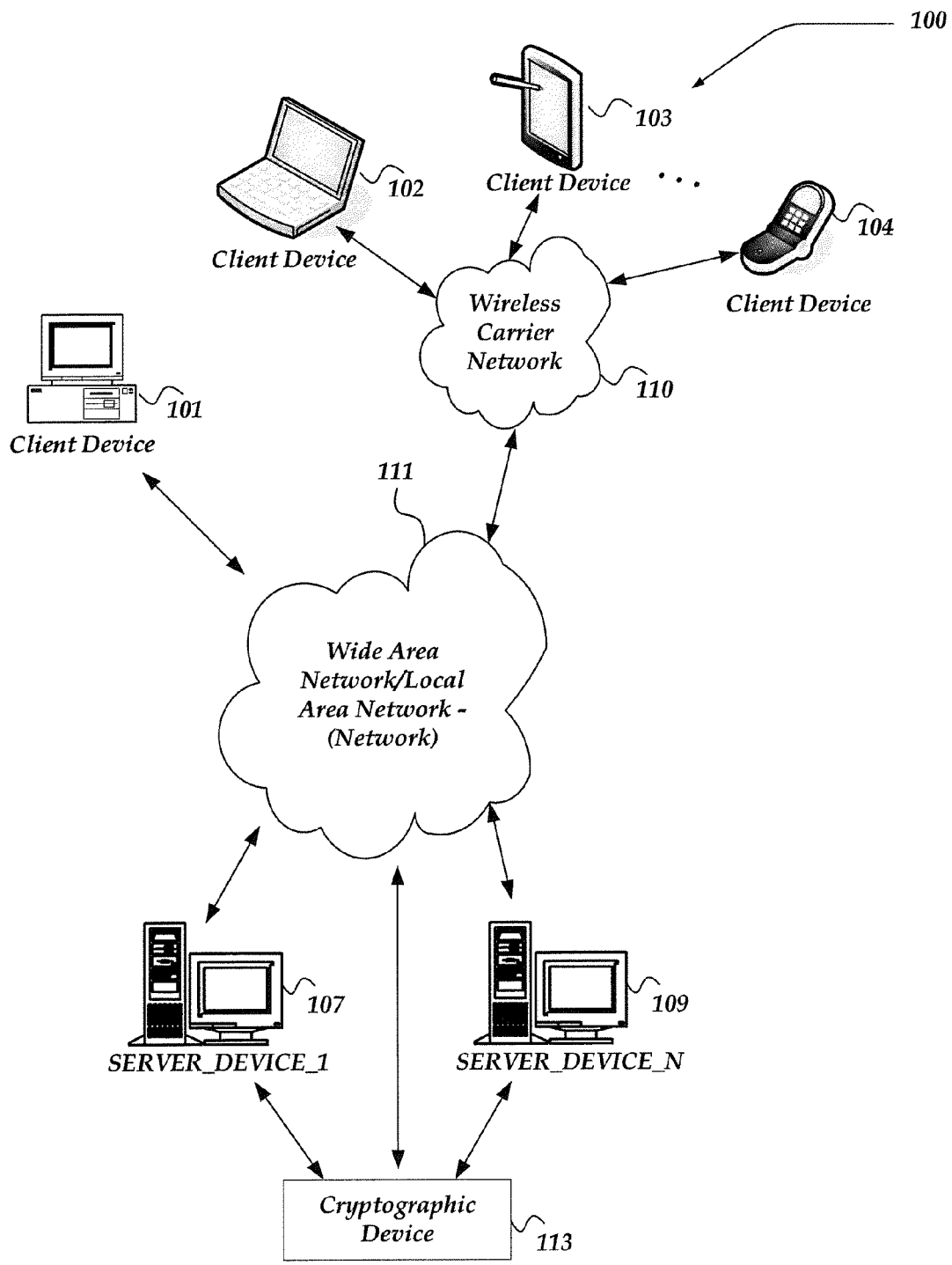
FIG. 1 is a system diagram of an environment in which at least one of the various embodiments may be practiced.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the faun of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "keying data" as used herein refers to seeding and/or entropy data. At least a portion of the keying data may be used by the cryptographic application if generating keys. In at least one of the various embodiments, multiple sets of keying data may be employed to generate a single cryptographic key. In at least one of the various embodiments, the keying data may be the same length as a key.

The term "key holder" as used herein refers to a user associated with a cryptographic key. In at least one of the various embodiments, key holders may be selected to provide keying data for a key name they have been associated with by a key manager.

The terms "encryption key", "cryptographic key", and "key" as used herein refer to cryptographic keys that may be used to do encryption and decryption operations. In at least one of the various embodiments, a key may be generated by XORing at least a portion of the keying data provided by one or more key holders.

The term "key name" as used herein refers to an identifier that may be associated with one or more cryptographic keys.

In at least one of the various embodiments, key names may be associated with key parameters, access rules, or the like. Key names may enable users to utilize cryptographic services from a cryptographic application without having to directly reference the underlying cryptographic keys that may be employed.

The term "key manager" as used herein refers to a user enabled and authorized to perform and/or initiate administrative cryptographic actions, such as, generating key names, generating key parameters, selecting key holders, triggering the cryptographic key rotation process, or the like.

The term "key parameters" as used herein refers to cryptographic parameters associated with a key name and/or cryptographic keys. In at least one of the various embodiments, key parameters may be the parameters and options employed if configuring an encryption algorithm, such as, key name, number of key holders, mode, padding, bit-size, or the like.

The term "activation password", "password" as used herein refers to passwords and/or pass-phrases used by a key holder to protect their keying data for a cryptographic key.

The term "system key" as used herein refers to a hard coded key compiled into a cryptographic application and/or embedded in a cryptographic device. The system key may be used for temporary encryption of stored key data.

The term "key array" as used herein refers to a data structure employed to collect and manage cryptographic keys, key parameters, keying data, checksums, or the like, that may be associated with a key name. The data structure may be implemented using well-known techniques such as, arrays, lists, hashes, dictionaries, buckets, lookup tables, or the like.

The terms "current cryptographic key" and "current key" as used herein refers to a cryptographic key that is associated with a key name and is available for use in current cryptographic operations. In at least one of the various embodiments, current cryptographic keys have been activated but not rotated. A cryptographic application may be enabled to provide one or more current cryptographic keys where each key name may correspond to one current cryptographic key. In at least one of the various embodiments, current cryptographic keys may be stored in volatile memory of a cryptographic device.

The terms "transitional cryptographic key" and "transitional key" as used herein refer to cryptographic keys that have been encrypted with a system key. Transitional keys are often current keys that are in the process of being rotated. Generally, transitional keys are unavailable for use in cryptographic operations while in the transitional state.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards secure cryptographic key rotation that enables cryptographic keys to be rotated without disrupting cryptographic operations. In at least one of the various embodiments, if cryptographic key rotation is initiated, a cryptographic application may generate a transitional cryptographic key by encrypting the current cryptographic key with a built-in system cryptographic key. In at least one of the various embodiments, the transitional cryptographic key may be temporarily stored in non-volatile storage (e.g., disk drives) during the key rotation process.

In at least one of the various embodiments, the cryptographic application may generate a new cryptographic key based on one or more determined key parameters. Such key parameters may include encryption strength, algorithm type, key length, key holders, key name, or the like. Next, in at least one of the various embodiments, the cryptographic application may enable the new cryptographic key to be activated by one or more key holders. In at least one of the various embodiments, key holders may provide keying data and activation passwords may be employed as part of the cryptographic key activation process.

In at least one of the various embodiments, if the new cryptographic key is activated, the cryptographic application may designate it as the new current cryptographic key. In at least one of the various embodiments, the new current cryptographic key may be employed to encrypt the stored transitional cryptographic key (the previous current cryptographic key). In at least one of the various embodiments, after the transitional cryptographic key is encrypted by the new current cryptographic key it may be stored in a key array. In at least one of the various embodiments, as additional key rotation occurs each rotated cryptographic key may be stored in the key array if it is encrypted by the designated current cryptographic key.

In at least one of the various embodiments, the current cryptographic key may be kept in volatile memory of a cryptography device rather than stored in non-volatile storage such as a disk drive. Thus, if the cryptography device loses power, or is reset, the current cryptographic key will be unavailable until it is re-activated. In at least one of the various embodiments, the current cryptographic key may be restored by executing the cryptographic key activation process using the key holders secret keying data and activation passwords. In at least one of the various embodiments, after a cryptography device reboots, key holder activation passwords may be provided/entered and used with the previously provided secret keying data to re-active the current cryptographic key. In at least one of the various embodiments, if a cryptography device is reset and/or reformatted (e.g., upon factory reset, or the like) new key holder secret keying data may be provided to re-create and/or re-activate the current key.

In at least one of the various embodiments, the cryptographic application may enable one or more key names to be generated by a key manager. In at least one of the various embodiments, each cryptographic key in the cryptographic application may be associated with a key name. In at least one of the various embodiments, key names enable a level of abstraction between the cryptographic keys and the users making requests for cryptographic operations. In at least one of the various embodiments, the key name may be a plain text string that the cryptographic application associates with one or more cryptographic keys. For example, in at least one of the various embodiments, a user may submit data for encryption designating which key name to use for encryption (e.g., encrypt 'ABCDEFG1234' using key name 'CREDIT-CARD'). The user may direct the cryptographic application to encrypt the passed in data using cryptographic keys that may be associated with the provided key name.

In at least one of the various embodiments, key managers may also specify the key parameters and any additional options that may be associated with the key name. In at least one of the various embodiments, parameters may include, designating users as key holders for the key name, key rotation options, lifetime of cryptographic keys, or the like. In at least one of the various embodiments, key managers may also configure one or more properties related to the use and/or administration of the key name and its associated keys including, IP filtering, user limits, or the like.

In at least one of the various embodiments, if generating a new key name, a key manager may enable the key name to support key rotation. In at least one of the various embodiments, key names that support key rotation may be assigned hashing and/or checksum algorithms to be used to generate checksums for the data that may be encrypted using the cryptographic keys associated with a particular key name.

In at least one of the various embodiments, these checksums may be employed by the cryptographic application to confirm/identify which cryptographic key was used to encrypt the data in the first place.

In at least one of the various embodiments, if a key name is generated, each key holder associated with the key name may enter or generate keying data for the key. In at least one of the various embodiments, as part of generating the keying data, the key holder may create an activation password that may be associated with the keying data for the key name. In at least one of the various embodiments, the keying data may be generated randomly rather than being entered by the key holder.

In at least one of the various embodiments, if each key holder associated with a key name enters their keying data and a corresponding activation password, the cryptographic key may be ready to be activated.

In at least one of the various embodiments, keying data may be stored in non-volatile memory (physical media) after being encrypted using an activation password supplied by a key holder.

In at least one of the various embodiments, if a key holder enters their keying data, the key holder may activate or deactivate the keying data they supplied by entering the corresponding activation password. In at least one of the various embodiments, if the keying data for each key holder is activated, the cryptographic key may be considered to be activated and available for use in cryptographic operations. In at least one of the various embodiments, a key manager may be enabled to rotate the activated cryptographic keys that may be associated with the key name.

In at least one of the various embodiments, a key manger may generate a new key name and/or cryptographic key by selecting an "Add Key" option on a user-interface of the cryptographic application (e.g., using a Graphical User Interface form, web page, command line interface, or the like). In at least one of the various embodiments, the cryptographic application may display a user-interface page and/or form that may enable the key manager to generate and configure a key name.

In at least one of the various embodiments, configuring the key name may include, the key manager providing one or more key parameters and a list of one or more key holders, or the like. In at least one of the various embodiments, the key manager may designate the key name as supporting key rotation. In at least one of the various embodiments, a checksum algorithm may be selected for use in key rotation.

In at least one of the various embodiments, the checksums may be employed by the cryptographic application as part of a process to verify that the correct cryptographic key is used to decrypt data that may have been encrypted using rotated cryptographic keys.

In at least one of the various embodiments, if the key parameters have been selected, the key manager selects "Save" on the "Add Key" page causing the cryptographic application to save the new key into a key array data structure. In at least one of the various embodiments, this data structure may be saved to non-volatile storage (e.g., disk storage). In at least one of the various embodiments, if the cryptographic device may be configured as a controller node, the new key information may be forwarded to authorized high availability backup nodes.

In at least one of the various embodiments, each key holder associated with the key provides an activation password and their keying data. In at least one of the various embodiments, each key holder may navigate a user-interface to provide their activation password to validate the keying data. In some of the various embodiments, the cryptographic application may notify key holders that one or more cryptographic keys may need to be activated. In at least one of the various embodiments, key holders may be notified using email, user interface alerts, short message service (SMS) messages, social networking messaging, or the like.

In at least one of the various embodiments, if the keying data and the activation password have been entered by the key holder, the key holder may select save, at which time the cryptographic application may calculate a checksum of the activation password prior to encrypting the keying data with the activation password. In at least one of the various embodiments, the cryptographic application may calculate a checksum that corresponds to the activation password. In at least one of the various embodiments, this checksum may be an eight byte unsigned integer. In other embodiments, different length checksums may be employed. In at least one of the various embodiments, the calculated checksum may be included in the key array data structure and saved to non-volatile memory.

In at least one of the various embodiments, one or more checksums based on the keying data used to generate the cryptographic key may be generated (e.g., using well-known checksum algorithms) and associated with its corresponding cryptographic key. Also, in at least one of the various embodiments, checksums may be generated based on the cryptographic keys. For example, in at least one of the various embodiments, if a key is rotated, the cryptographic application may discard some or all of the keying data associated with the cryptographic key being rotated. Thus, embodiments may generate another checksum from the cryptographic key itself, or the checksum may be based on a different set of keying data (e.g., including key parameters).

In at least one of the various embodiments, each checksum based on keying information may be associated with its corresponding cryptographic key. In at least one of the various embodiments, these checksums may be stored in a key array structure along with the cryptographic keys. Further, in at least one of the various embodiments, these checksums may be stored separate from the cryptographic keys.

In at least one of the various embodiments, during cryptographic operations, a cryptographic application may generate a checksum value for the cryptographic key being used and compare it to the previously generated checksum that is associated with key. If the two checksums have the same value, the corresponding cryptographic key may be considered to be valid/non-corrupt. Otherwise, if the checksums have different values, the corresponding cryptographic key may be considered to be invalid and/or otherwise unusable (e.g., corrupted).

In at least one of the various embodiments, if corrupt and/or invalid cryptographic keys may be detected, the cryptographic application may be enabled to perform additional actions, such as, canceling the effected cryptographic operation, quarantining the invalid/corrupt cryptographic key(s), generating error notifications, or the like. In at least one of the various embodiments, the actions performed if invalid/corrupt cryptographic keys are detected may be determined based on configuration values set by a user.

In at least one of the various embodiments, the cryptographic application may encrypt the keying data using the activation password. In at least one of the various embodiments, a built-in key referred to as the "external key" and/or a system key may be XOR'd with other cryptographic keys before encrypting. Also, in at least one of the various embodiments, the activation password may be converted to a key using the NIST SP800-132 Special Publication.

In at least one of the various embodiments, the activation password checksum may be used to determine if the key holder has provided the correct activation password if activating or deactivating the keying data. If the checksum of the activation password provided by a key holder matches the activation password checksum that was generated during key creation, the cryptographic application may confirm that the activation password corresponds to the keying data. In at least one of the various embodiments, if key holders attempt to activate keying data, they may provide their activation password to the cryptographic application. In at least one of the various embodiments, the cryptographic application may decrypt the keying data using the activation password provided by the user.

In at least one of the various embodiments, the encrypted keying data and the activation password checksum may be included in the key array structure and saved to non-volatile memory.

In at least one of the various embodiments, if the cryptographic device may be configured as a controller node, the new key information may be forwarded to authorized high availability child/backup nodes. Further, in at least one of the various embodiments, if checksums corresponding to the cryptographic keys are available, they may be forwarded to the child/backup nodes along with their corresponding cryptographic keys/cryptographic key information. For example, in at least one of the various embodiments, the key array structure may include checksum values that correspond to each included cryptographic key.

In at least one of the various embodiments, the cryptographic device may use predefined cryptographic keys and key parameters to encrypt the key array data structure before writing it to non-volatile memory and before transmitting the key array to any high availability child/backup devices/nodes.

In at least one of the various embodiments, if cryptographic keys and checksums corresponding to the cryptographic keys are received by a child node, the cryptographic application on the child node may generate checksums for the received cryptographic keys and compare them with the received checksums to validate the corresponding received cryptographic keys.

In at least one of the various embodiments, if corrupt and/or invalid cryptographic keys may be detected by the cryptographic application on a child node, further action, such as, canceling effected cryptographic operations, quarantining the invalid/corrupt cryptographic key(s), generating error notifications, requesting the controller to resend the cryptographic key and key information, or the like.

In least one of the various embodiments, if each key holder for a cryptographic key has provided and validated keying data, key creation may be complete. In at least one of the various embodiments, however, the generated cryptographic key may be un-usable until each key holder has activated and/or validated its keying data using the appropriate activation password.

In at least one of the various embodiments, if the key manager has configured the cryptographic key name to include a checksum, the key may be eligible to be rotated by the key manager if it has been activated by all the key holders associated with the key.

Illustrative Key Rotation Procedure

In at least one of the various embodiments, if the key holders associated with a cryptographic key have activated their keying data, a key manager may be enabled to rotate the cryptographic key. In at least one of the various embodiments, key rotation enables changing cryptographic keys, as required by most data-security regulations, while also allowing the key manager to modify the key name's configuration parameters, including the key holders, checksum algorithm (s), or the like. In at least one of the various embodiments, the cryptographic application may be arranged to prevent the key manager from changing the 'name' of the key name during rotation.

In at least one of the various embodiments, if key rotation is initiated, the current cryptographic key may be encrypted using the system key and stored in non-volatile physical media. In at least one of the various embodiments, the key holder keying data associated with current cryptographic key may be deleted. In at least one of the various embodiments, if a checksum generated based on the keying data is available, this checksum may be discarded and replaced by checksum generated based on the cryptographic key (for cryptographic key validation/corruption detection).

In at least one of the various embodiments, the system key may be obtained by XORing a cryptographic device initialization password (e.g., using NIST SP800-132 to convert it to a key) with a predefined key provided by the cryptographic application and/or the cryptographic device. In at least one of the various embodiments, an empty/skeleton cryptographic key may be created with blank keying data. Then each key holder then generates and activates their keying data for the new cryptographic key. If activated, the new cryptographic key may be linked to the cryptographic key that is being rotated (i.e., the new cryptographic key may be linked to the previous cryptographic key).

In at least one of the various embodiments, if the rotated cryptographic key has been generated and activated by all associated key holders, the previously rotated cryptographic key may be decrypted using the system key and encrypted using the new cryptographic key (the new current cryptographic key for the key name) and included in the key array. In at least one of the various embodiments, decryption of the older cryptographic key may be enabled if each key holder has activated their keying data for the new current cryptographic key.

In at least one of the various embodiments, one or more checksums based on the keying data, that may include, key holder supplied keying data, key parameters, activation password(s), or the like (including various combinations thereof), may be generated and associated with the new cryptographic key. Also, in at least one of the various embodiments, one or more checksums based on the older cryptographic key value may be generated and associated with the older (rotated) cryptographic key.

In at least one of the various embodiments, the high availability backup cryptographic devices/nodes may use the older cryptographic keys until the activation of the new cryptographic key may be completed. In at least one of the various embodiments, this may prevent the previous password from being passed in an insecure manner. In at least one of the various embodiments, it may also allow the previous cryptographic key to continue to function on the high availability backup cryptographic devices/nodes until the new cryptographic key has been fully activated.

In at least one of the various embodiments, a date and time may be associated with a rotated cryptographic key to enable cryptographic application to begin using the cryptographic key for cryptographic operations at a defined future time.

In at least one of the various embodiments, the cryptographic key being rotated may be held in volatile memory until the new cryptographic key may be activated. In at least one of the various embodiments, this method may avoid the reduced security that may result from using a predefined system key to encrypt the rotated cryptographic keys and storing them in non-volatile memory until the new cryptographic key is activated and ready to use.

In at least one of the various embodiments, the cryptographic application may be enabled to operate in an administrator mode configuration which may be employed to provide system wide parameters and configurations that may be used for one or more cryptographic keys, such as, establishing a minimum number of key holders per cryptographic key.

In at least one of the various embodiments, if a new cryptographic key for a key name is activated, the cryptographic device and/or cryptographic application may process future incoming encryption requests using the new cryptographic key. In at least one of the various embodiments, this new cryptographic key may be the current cryptographic key for the key name. In at least one of the various embodiments, the current cryptographic key may also be sent to all the high availability backup cryptographic devices/nodes.

In at least one of the various embodiments, in response to a decryption request, a cryptographic application may first attempt to use a key name's current cryptographic key to decrypt the data. In at least one of the various embodiments, the cryptographic application may generate a local checksum from the decrypted data using the checksum method associated with the key name. In at least one of the various embodiments, if the checksum retrieved from the decrypted data does not match the locally generated checksum, the cryptographic application may determine that the current cryptographic key was not used to encrypt the data. Accordingly, the cryptographic application may check for an available rotated cryptographic key.

In at least one of the various embodiments, if a rotated cryptographic key may be available, the cryptographic application may attempt to decrypt the received data with the rotated cryptographic key, again comparing the checksum included with the received decrypted data with the locally generated checksum. In at least one of the various embodiments, if the checksum that was included in the received data again does not match the locally generated checksum, the cryptographic application may attempt to locate a previously rotated cryptographic key. In at least one of the various embodiments, if an eligible rotated cryptographic key may be located and retrieved, the decryption and validation process may be repeated until either the data is decrypted by the correct cryptographic key or all (or at least a portion) of the available cryptographic keys are exhausted.

In at least one of the various embodiments, the cryptographic application receives data for encryption and may generate an encrypted data packet that includes a checksum generated from the received data. In at least one of the various embodiments, the cryptographic application may be configured to generate an encrypted data packet that includes the checksum generated from the received data in a 'header' section of the packet.

For example, in at least one of the various embodiments, the cryptographic application may prepend the checksum to the data before it is encrypted. Then the cryptographic application may encrypt the packet that includes the checksum and the received data using the current cryptographic key.

In at least one of the various embodiments, if data may be received for decrypting, the cryptographic application may perform actions such as, decrypting the data with a cryptographic key, parsing the checksum value out of the decrypted packet. A local checksum value may be generated from the decrypted data. The local checksum may be compared to the checksum that was received with (parsed out of) the encrypted data to determine if the data has been decrypted successfully. Otherwise, if the locally generated checksum and the received checksum have difference values another cryptographic key may need to be tried.

In at least one of the various embodiments, the cryptographic application may employ previously generated cryptographic keys without using a different key name because multiple generations of rotated cryptographic keys may be associated with the same key name. In at least one of the various embodiments, this enables users to use the same key name that has a new cryptographic key without requiring an update to the records and/or systems that rely on older (rotated) cryptographic keys.

For example, in at least one of the various embodiments, by storing previous (rotated) cryptographic keys, the cryptographic application may enable decryption of older data rather than making users decrypt and re-encrypt their data to be compatible with the new rotated cryptographic key(s). In at least one of the various embodiments, if an older/rotated cryptographic key for a key name was used to encrypt the data, the key rotation process may enable decryption of the data by employing an eligible older (rotated) cryptographic key.

In at least one of the various embodiments, the cryptographic application may employ checksums associated with an operative cryptographic key to confirm that the cryptographic key is valid (e.g., not corrupt). In at least one of the various embodiments, the cryptographic application may be enabled to generate a checksum value for a cryptographic key and compare it to the previously generated checksum that is associated with the cryptographic key. In at least one of the various embodiments, if the two checksum values are different, a corrupted or otherwise invalid cryptographic key may be indicated.

Illustrative Operating Environment

FIG. 1 shows components of one embodiment of an environment in which the invention may be practiced. Not all the components may be required to practice various embodiments, and variations in the arrangement and type of the components may be made. As shown, system 100 of FIG. 1 includes local area networks ("LANs")/wide area networks ("WANs")—(network) 111, wireless network 110, client devices 101-104, server devices 1-N 107-109, and cryptographic device 113.

Generally, client devices 102-104 may include virtually any portable computing device capable of receiving and sending a message over a network, such as network 111, wireless network 110, or the like. Client devices 102-104 may also be described generally as client devices that are configured to be portable. Thus, client devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDA's), handheld computers, laptop computers, wearable computers, tablet computers, integrated devices combining one or more of the preceding devices, or the like. As such, client devices 102-104 typically range widely in terms of capabilities and features. For example, a cell phone may have a numeric keypad and a few lines of monochrome Liquid Crystal Display (LCD) on which only text may be displayed. In another example, a web-enabled mobile device may have a touch sensitive screen, a stylus, and several lines of color LCD in which both text and graphics may be displayed.

Client device 101 may include virtually any computing device capable of communicating over a network to send and receive information, including messaging, performing various online actions, or the like. The set of such devices may include devices that typically connect using a wired or wireless communications medium such as personal computers, multiprocessor systems, microprocessor-based or programmable consumer electronics, network Personal Computers (PCs), or the like. In one embodiment, at least some of client devices 102-104 may operate over wired and/or wireless network. Today, many of these devices include a capability to access and/or otherwise communicate over a network such as network 111 and/or even wireless network 110. Moreover, client devices 102-104 may access various computing applications, including a browser, or other web-based application.

In one embodiment, one or more of client devices 101-104 may be configured to operate within a business or other entity to perform a variety of services for the business or other entity. For example, client devices 101-104 may be configured to operate as a web server, an accounting server, a production server, an inventory server, or the like. However, client devices 101-104 are not constrained to these services and may also be employed, for example, as an end-user computing node, in other embodiments. Further, it should be recognized that more or less client devices may be included within a system such as described herein, and embodiments are therefore not constrained by the number or type of client devices employed.

A web-enabled client device may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, or the like, to display and send a message. In one embodiment, a user of the client device may employ the browser application to perform various actions over a network.

Client devices 101-104 also may include at least one other client application that is configured to receive and/or send data, including budgeting and forecasting information, between another computing device. The client application may include a capability to provide requests and/or receive data relating to managing, operating, or configuring the cryptographic module and/or cryptographic device 113. In some embodiments, the client application may employ processes such as described below in conjunction with FIGS. 5-10 to perform at least some of its actions.

Wireless network 110 is configured to couple client devices 102-104 and its components with network 111. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G), 5th (5G) generation radio access for cellular systems, WLAN, Wireless Router (WR) mesh, or the like. Access technologies such as 2G, 3G, 4G, and future access networks may enable wide area coverage for mobile devices, such as client devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), or the like. In essence, wireless network 110 may include virtually any wireless communication mechanism by which information may travel between client devices 102-104 and another computing device, network, or the like.

Network 111 is configured to couple network devices with other computing devices, including, servers 107-109, cryptographic device 113, client device(s) 101, and through wireless network 110 to client devices 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. For example, various Internet Protocols (IP), Open Systems Interconnection (OSI) architectures, and/or other communication protocols, architectures, models, and/or standards, may also be employed within network 111 and wireless network 110. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media. Such communication media is distinct from, however, computer-readable devices described in more detail below.

Figure 2:
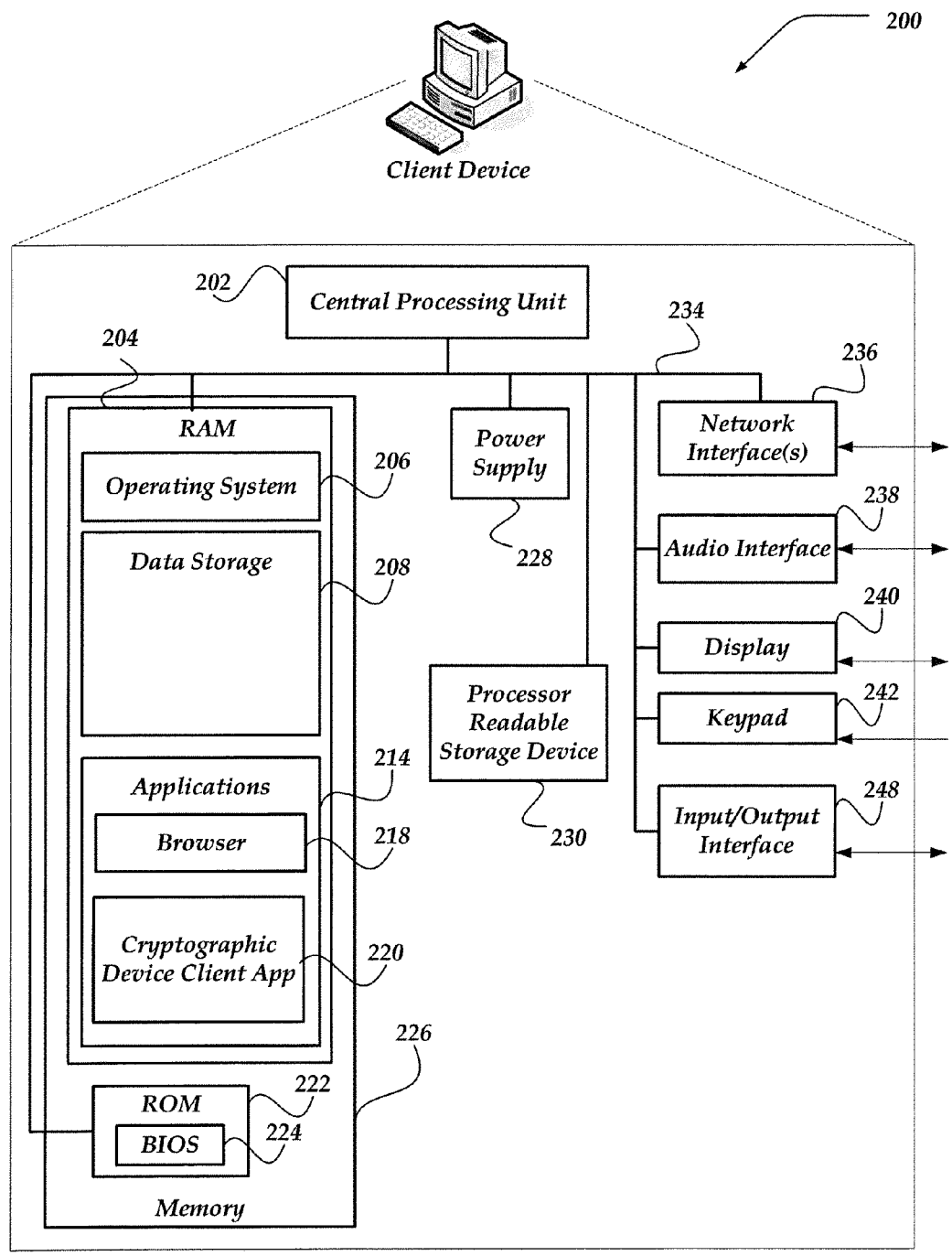
FIG. 2 shows a client device in which at least one of the various embodiments may be practiced.

Cryptographic device 113 may include virtually any network device usable to provide cryptographic services, such as network device 200 of FIG. 2. In one embodiment, cryptographic device 113 employs various techniques to encrypt and/or decrypt data and messaging information, including providing encryption/decryption services for servers 107-109. In at least one of the various embodiments, cryptographic device 113 may be operative to provide cryptographic services such as encrypting/decrypting non-volatile and volatile memory associated with guest hosts and guest operating system images operating in virtualized environments, including those that may be operating and/or installed on servers 107-109.

Devices that may operate as cryptographic device 113 include various network devices, including, but not limited to personal computers, desktop computers, multiprocessor systems, microprocessor-based or programmable consumer electronics, network PCs, server devices, network appliances, or the like. It should be noted that while cryptographic device 113 is illustrated as a single network device, the invention is not so limited. Thus, in another embodiment, cryptographic device 113 may represent a plurality of network devices. For example, in one embodiment, cryptographic device 113 may be distributed over a plurality of network devices and/or implemented using cloud architecture.

Moreover, cryptographic device 113 is not limited to a particular configuration. Thus, cryptographic device 113 may operate using a master/slave approach over a plurality of network devices, within a cluster, a peer-to-peer architecture, and/or any of a variety of other architectures. Thus, cryptographic device 113 is not to be construed as being limited to a single environment, and other configurations, and architectures are also envisaged. Cryptographic device 113 may employ processes such as described below in conjunction with FIGS. 4-10 to perform at least some of its actions.

Illustrative Client Device

FIG. 2 shows one embodiment of client device 200 that may be included in a system implementing embodiments of the invention. Client device 200 may include many more or less components than those shown in FIG. 2. However, the components shown are sufficient to disclose an illustrative embodiment for practicing the present invention. Client device 200 may represent, for example, one embodiment of at least one of client devices 101-104 of FIG. 1.

As shown in the figure, client device 200 includes a central processing unit ("CPU") 202 in communication with a mass memory 226 via a bus 234. Client device 200 also includes a power supply 228, one or more network interfaces 236, an audio interface 238, a display 240, a keypad 242, and an input/output interface 248. Power supply 228 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, global system for mobile communication ("GSM"), code division multiple access ("CDMA"), time division multiple access ("TDMA"), user datagram protocol ("UDP"), transmission control protocol/Internet protocol ("TCP/IP"), short message service ("SMS"), general packet radio service ("GPRS"), WAP, ultra wide band ("UWB"), IEEE 802.16 Worldwide Interoperability for Microwave Access ("WiMax"), session initiated protocol/real-time transport protocol ("SIP/RTP"), or any of a variety of other wireless communication protocols. Network interface 236 is sometimes known as a transceiver, transceiving device, or network interface card ("NIC").

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action. Display 240 may be a liquid crystal display ("LCD"), gas plasma, light emitting diode ("LED"), or any other type of display used with a computing device. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Mass memory 226 includes a Random Access Memory ("RAM") 204, a Read-only Memory ("ROM") 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Windows Mobile™, or the Symbian® operating system.

Mass memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. At least a portion of the information may also be stored on a disk drive or other processor-readable storage device 230 within client device 200.

Applications 214 may include computer executable instructions which, when executed by client device 200, transmit, receive, and/or otherwise process network data. Examples of application programs include, but are not limited to calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth. Applications 214 may include, for example, browser 218 and cryptographic device client application 220.

Browser 218 may include virtually any application configured to receive and display graphics, text, multimedia, and the like, employing virtually any web based language. In one embodiment, the browser application is enabled to employ HDML, WML, WMLScript, JavaScript, SGML, HTML, XML, and the like, to display and send a message. However, any of a variety of other web-based languages may be employed. In one embodiment, browser 218 may enable a user of client device 200 to communicate with another network device, such as server devices 107 and/or 109 of FIG. 1. In one embodiment, browser 218 may enable a user to view and/or manipulate cryptographic device configuration features, status reports, administrative functions, or the like.

In at least one of the various embodiments, a user may employ client device 200 to interact and access information stored or otherwise managed using cryptographic device 113. In at least one of the various embodiments, cryptographic device client application 220 may be arranged to enable a user to view and/or manipulate cryptographic device configuration features, status reports, administrative functions, or the like, as further discussed below.

In any event, cryptographic device client application 220 may employ processes similar to those described below in conjunction with FIGS. 5-10 to perform at least some of its actions.

Illustrative Network Device

Figure 3:
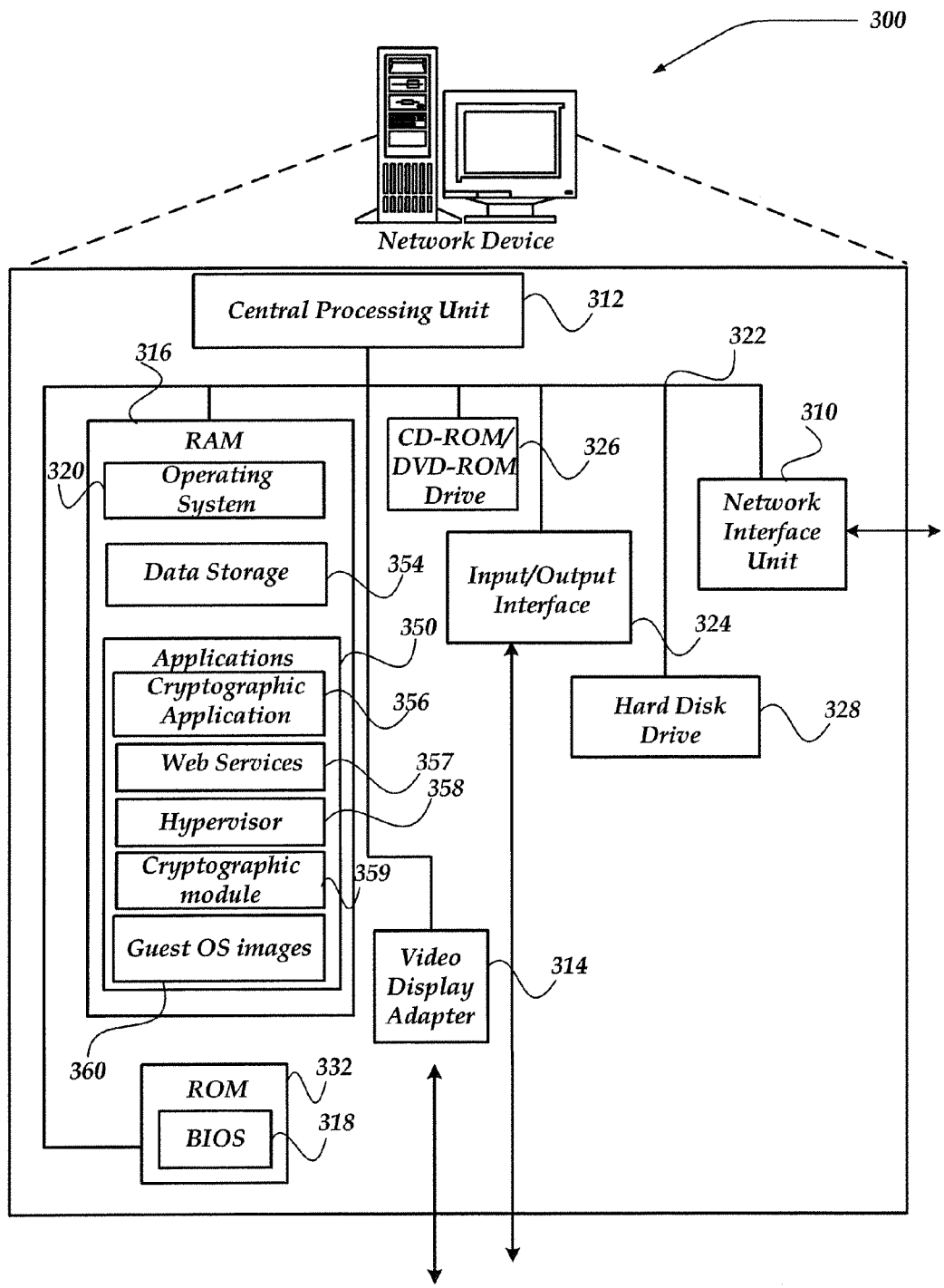
FIG. 3 shows a client device in which at least one of the various embodiments may be practiced.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may represent, for example, cryptographic device 113 of FIG. 1.

Network device 300 includes central processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, flash drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC). Network device 300 also includes input/output interface 324 for communicating with external devices, such as a headset, or other input or output devices not shown in FIG. 3. Input/output interface 324 can utilize one or more communication technologies, such as USB, infrared, Bluetooth™, or the like.

The mass memory as described above illustrates another type of computer-readable media, namely computer-readable storage media. Computer-readable storage media (devices) may include volatile, nonvolatile, removable, and non-removable media implemented in any method or technology for storage of information, such as computer readable instructions, data structures, program modules, or other data. Examples of computer readable storage media include RAM, ROM, Electronically Erasable Programmable Read-Only Memory (EEPROM), flash memory or other memory technology, Compact Disc Read-Only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computing device.

As shown, data storage 354 may include a database, text, spreadsheet, folder, file, or the like Data storage 354 may further include program code, data, algorithms, or the like, for use by a processor, such as central processing unit (CPU) 312 to execute and perform actions. In one embodiment, at least some of data and/or instructions stored in data stores 354 might also be stored on another device of network device 300, including, but not limited to cd-rom/dvd-rom 326, hard disk drive 328, or other computer-readable storage device resident on network device 300 or accessible by network device 300 over, for example, network interface unit 310.

The mass memory also stores program code and data. One or more applications 350 are loaded into mass memory and run on operating system 320. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Mass memory may also include cryptographic application 356, web services 357, hypervisor 358, cryptographic module 359, and guest applications 360.

Web services 357 represent any of a variety of services that are configured to provide content, over a network to another computing device. Thus, web services 357 include for example, a web server, a File Transfer Protocol (FTP) server, a database server, a content server, or the like. Web services 357 may provide the content over the network using any of a variety of formats, including, but not limited to WAP, HDML, WML, SGML, HTML, XML, compact HTML (cHTML), extensible (xHTML), or the like.

In one embodiment, web services 357 may provide an interface for accessing and manipulating data in a data store, such as data storage 354, or the like. In another embodiment, web services 357 may provide interfaces for interacting with cryptographic application 356 and/or cryptographic module 359 that may enable a user to access and/or otherwise manage cryptographic services that may be provided through network device 300. For example, in at least one of the various embodiments, a user may access and/or otherwise manage cryptographic services using client devices 101-104.

In at least one of the various embodiments, hypervisor 358 may manage one or more virtualized guest applications and/or or guest operating systems that may be operating on network device 300. In at least one of the various embodiments, guest applications may be virtualized hosts that may be operating under the management of hypervisor 358. In at least one of the various embodiments, hypervisor 358, cryptographic module 359, and guest applications 360 may be operating on servers 107-109.

In at least one of the various embodiments, cryptographic module 359 may be enabled to encrypt and decrypt volatile and non-volatile memory that may be used by guest applications 360. In at least one of the various embodiments, cryptographic module 359 may be component of hypervisor 358 or, it may be deployed as a process, plug-in, extension, kernel module, or the like.

In at least one of the various embodiments, cryptographic application 356 may be deployed on a computing appliance network device, such as, cryptographic device 113, separate from hypervisor 358, cryptographic module 359, and/or guest applications 360 that may be utilizing the cryptographic services provided by cryptographic application 356. In at least one of the various embodiments, cryptographic application 356 may be located on and may be operative on the same network device as hypervisor 358, cryptographic module 359, and guest applications 360.

In any event, in at least one of the various embodiments, cryptographic application 356, web services 357, hypervisor 358, cryptographic module 359, and/or guest applications 360 may employ processes, or parts of processes, similar to those described in conjunction with FIGS. 4-10 to perform at least some actions.

Illustrative Logical Schematics

Figure 4:
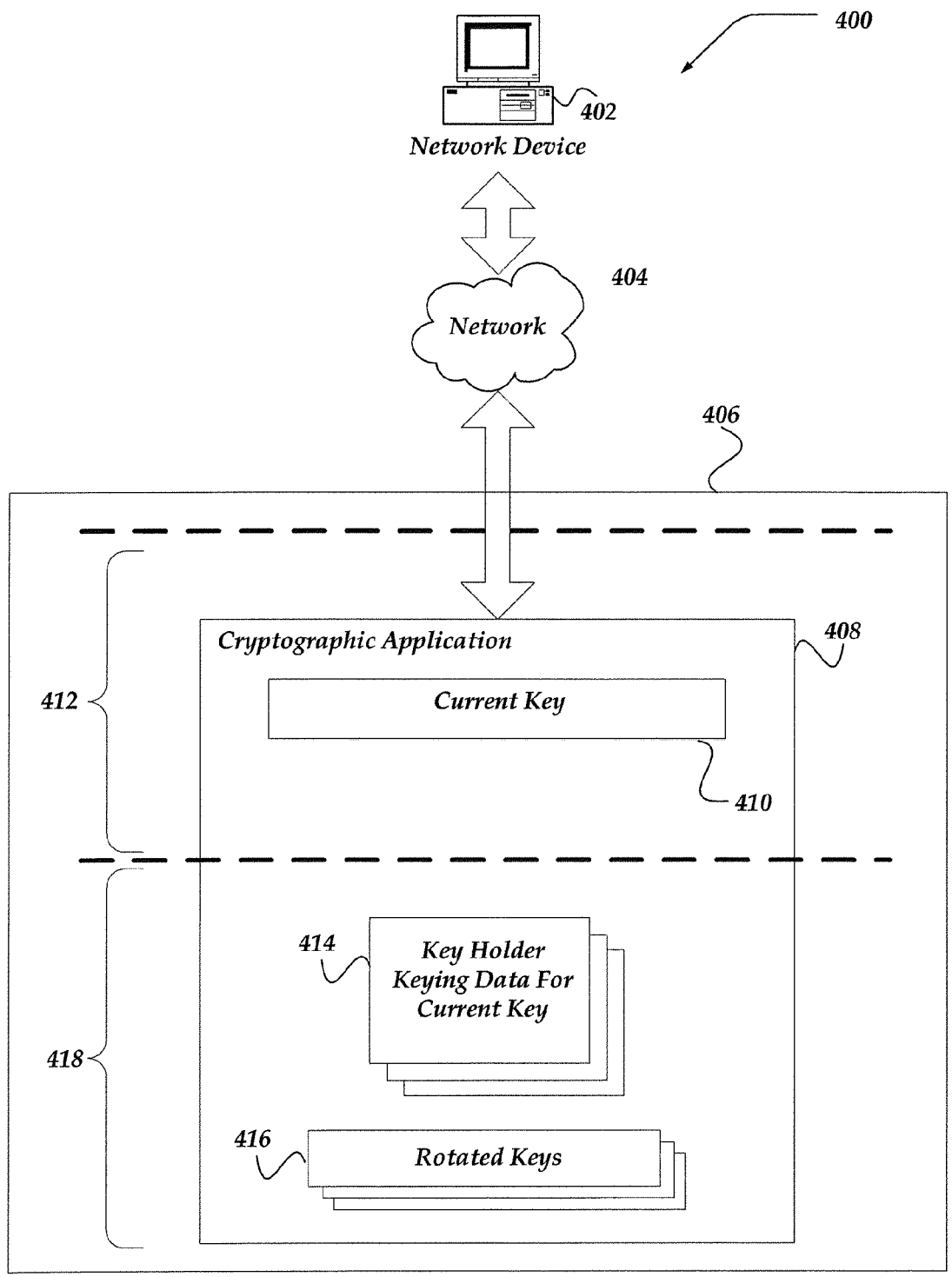
FIG. 4 shows a logical schematic of a cryptographic device and cryptographic application in accordance with at least one of the various embodiments.

FIG. 4 shows a logical schematic of cryptographic application 400 in accordance with at least one of the various embodiments. In at least one of the various embodiments, network device 402 may be employing network 404 to receive cryptographic services from cryptographic device 406. In at least one of the various embodiments, cryptographic application 408 may be installed and operative on cryptographic device 406. In at least one of the various embodiments, cryptographic device 406 may be a hardware module and/or component that may be included in cryptographic device 113, network device 300, or the like. In at least one of the various embodiments, cryptographic application 408 may be implemented as a stand-alone software program, executable, module, library, plug-in, or the like, such as cryptographic application 356, and/or cryptographic module 359, or the like.

In at least one of the various embodiments, network device 402 may submit data to cryptographic application 406 for encryption or decryption. In at least one of the various embodiments, cryptographic application 408 may employ current cryptographic key 410 to encrypt and/or decrypt the data submitted by network device 402.

In at least one of the various embodiments, at least the portion of cryptographic application 408 that includes current cryptographic key 410 may be maintained in volatile memory space 412 of cryptographic device 406. In at least one of the various embodiments, if the cryptographic device loses power, is restarted, is rebooted, or the like, volatile memory space 412 may be reset (e.g., erased, cleared, or the like). In at least one of the various embodiments, if volatile memory space 412 is reset, current cryptographic key 410 may be destroyed because it is instantiated in the volatile memory of the cryptographic device. And, in at least one of the various embodiments, for the operational life of the current cryptographic key it may exist in volatile memory space.

In at least one of the various embodiments, key holder keying data 414 that may have been used to generate current cryptographic key 410 may be stored in non-volatile memory space 418. Likewise, in at least one of the various embodiments, previously rotated cryptographic keys 416 may be stored in non-volatile memory space 418. Accordingly, in at least one of the various embodiments, if operation of cryptographic device 406 is interrupted for reasons such as, losing power, shutdowns, rebooting, restarting, equipment/component failure, or the like, keying data 414 and rotated cryptographic keys 416 may be recoverable from non-volatile memory.

In at least one of the various embodiments, if cryptographic device 406 is restarted, and/or the content of the volatile memory is lost and/or reset, the current cryptographic key may be recreated from keying data 414 if the key holders validate and activate the keying data by using their respective activation passwords that correspond to the current cryptographic key.

In at least one of the various embodiments, a key name may be associated with at least a current cryptographic key, keying data, and rotated cryptographic keys. Furthermore, even though only one current cryptographic key, one set of current cryptographic key keying data, and one set of rotated cryptographic keys is shown in FIG. 4, multiple sets may be operative in a cryptographic application and/or cryptographic device each associated with a different key name. In at least one of the various embodiments, each key name operative in a cryptographic application may have at least a corresponding current cryptographic key, keying data for the current cryptographic key, and a set of rotated cryptographic keys.

Figure 5:
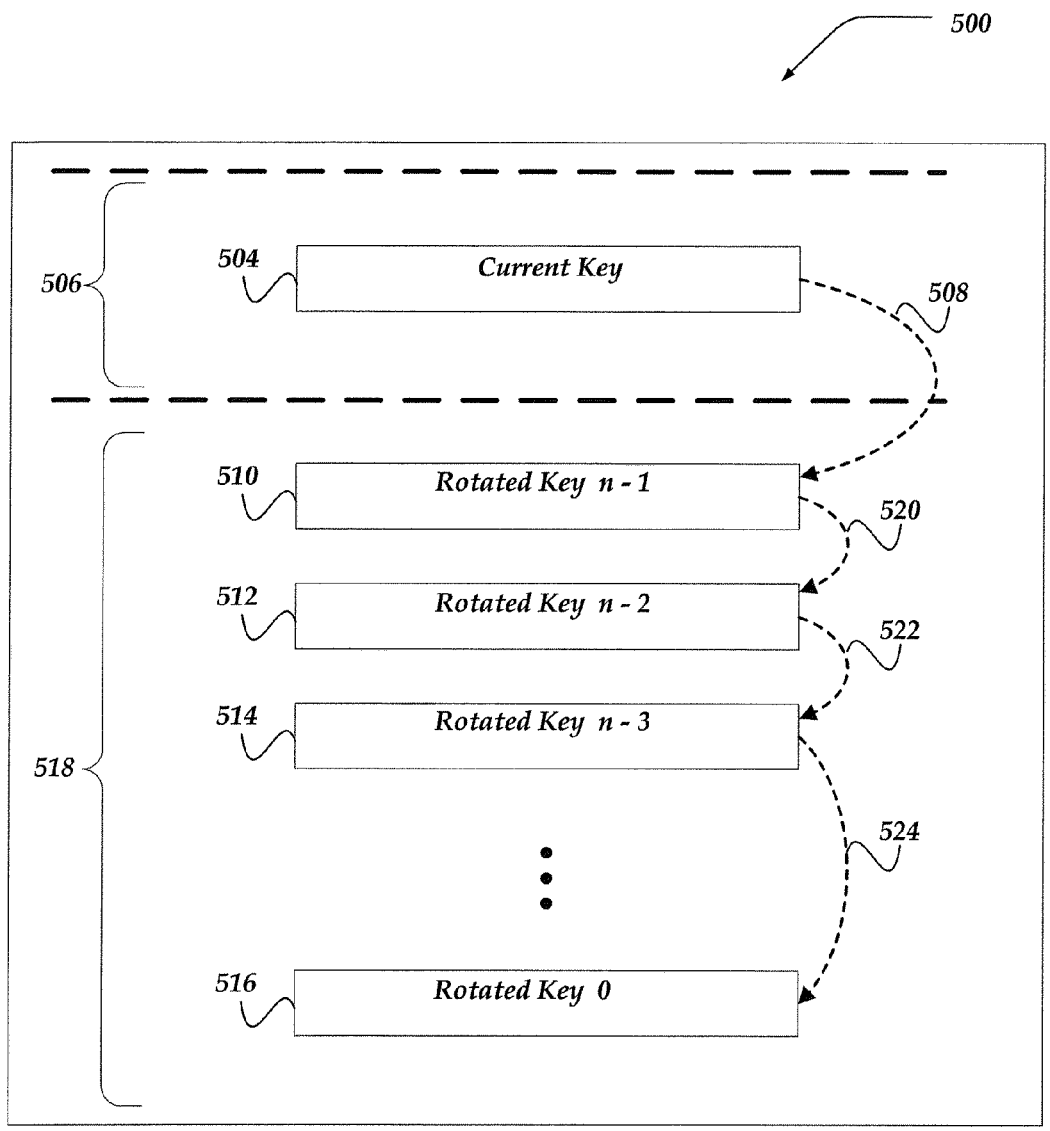
FIG. 5 shows a logical schematic of cryptographic keys in accordance with at least one of the various embodiments.

FIG. 5 shows a logical schematic of cryptographic keys in cryptographic device 500 in accordance with at least one of the various embodiments. In at least one of the various embodiments, cryptographic device 500 represents a portion of a cryptographic device that includes the cryptographic keys that may be employed by a cryptographic application, such as, cryptographic application 356.

In at least one of the various embodiments, current cryptographic key 504 may be the cryptographic key that is activated and employed by the cryptographic application for encrypting data submitted for encryption. Also, in at least one of the various embodiments, current cryptographic key 504 may be employed for decrypting data that was encrypted using the same current cryptographic key. In at least one of the various embodiments, current cryptographic key 504 may be associated with a key name.

In at least one of the various embodiments, current cryptographic key 504 (and its associated data structures) may be located in volatile memory space 506. In at least one of the various embodiments, if the operation of the cryptographic application may be interrupted, volatile memory space 506 may be reset, disabling access to current cryptographic key 504. In at least one of the various embodiments, access to current cryptographic key 504 may be restored and/or the key reconstituted if it is re-activated by its associated key holders.

In at least one of the various embodiments, current cryptographic key 504 may be associated with one or more rotated cryptographic keys 510-516. Link 508 may represents a portion of a data structure linking current cryptographic key 504 to rotated cryptographic key 510.

In at least one of the various embodiments, rotated cryptographic key 510 may be encrypted by current cryptographic key 504 and stored in non-volatile memory space 518 in a data structure, such as a key array. In at least one of the various embodiments, rotated cryptographic key 510 may be the most recently rotated cryptographic key for the cryptographic application. Similarly, in at least one of the various embodiments, rotated cryptographic key 512 may be the next most recent, rotated cryptographic key 514 the next most, and rotated cryptographic key 516 may represent a first cryptographic key (the oldest cryptographic key for a given key name) that may have been rotated.

In at least one of the various embodiments, links 520-524 represent the data structure associations linking the rotated cryptographic keys to each other. In at least one of the various embodiments, each rotated cryptographic key may be linked to the cryptographic key that it replaced during key rotation. In at least one of the various embodiments, in addition to being linked and/or associated with the cryptographic key that came after, the rotated cryptographic key may be encrypted by the newer cryptographic key. In at least one of the various embodiments, accordingly to recover an older cryptographic key the newer cryptographic key may be used to decrypt the older cryptographic key to enable use of the older cryptographic key.

In at least one of the various embodiments, cryptographic keys that may be linked together may each be associated with the same key name. As cryptographic keys are rotated they may remain associated with their original key name.

For example, in at least one of the various embodiments, to enable the use of rotated cryptographic key 516, current cryptographic key 504 must be used to decrypt rotated cryptographic key 510; decrypted rotated cryptographic key 510 may then be used to decrypt rotated cryptographic key 512; decrypted rotated cryptographic key 512 may be used to decrypt rotated cryptographic key 514; and so on. Eventually, in at least one of the various embodiments, rotated cryptographic key 516 may be decrypted by the decrypted rotated cryptographic key that came before it making it available for use in cryptographic operations.

In at least one of the various embodiments, failure to decrypt a prior rotated cryptographic key may prevent a subsequent rotated cryptographic key from being used because the subsequent rotated cryptographic key may be encrypted by the rotated cryptographic key (or current cryptographic key) that came after it. Accordingly, if the current cryptographic key is absent or destroyed none of the rotated cryptographic keys may be usable because the first rotated cryptographic key in the chain may remain encrypted and unusable until the current cryptographic key that was used to encrypt it is available.

Thus, in at least one of the various embodiments, the rotated cryptographic keys in non-volatile memory remain unusable for encryption or decryption unless a correct current cryptographic key may be available and activated.

In at least one of the various embodiments, the current cryptographic key, rotated cryptographic keys, key name, keying data, checksums, or the like, may be included in a data structure such as a key array. In at least one of the various embodiments, the key array may enable directional and/or bi-directional iteration through the collection cryptographic keys. In at least one of the various embodiments, various well-known data structures may be employed to link and/or associate the current cryptographic key, rotated cryptographic keys, key name, keying data, or the like, together. One of ordinary skill in the art will appreciate that a combination of one or more arrays, linked lists, database tables, or the like, may be employed to link and/or associate the current cryptographic key, rotated cryptographic keys, checksums, key name, keying data, key parameters or the like.

Generalized Operation

FIGS. 6-10 include flowcharts that illustrate the generalized operations for at least one of the various embodiments.

Figure 6:
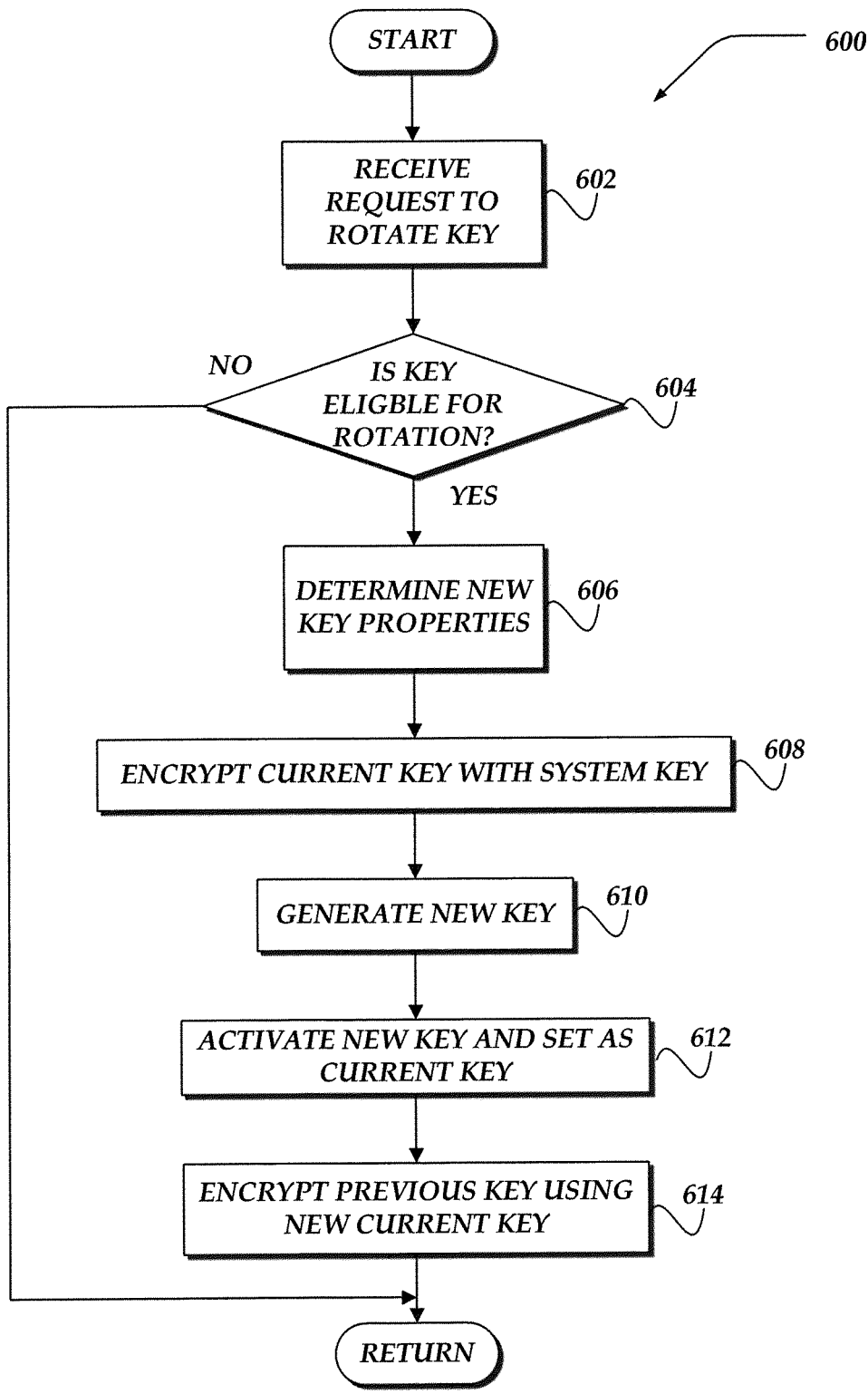
FIG. 6 shows a flowchart for a process that may be used for rotating cryptographic keys in accordance with at least one of the various embodiments.

FIG. 6 shows a flowchart for process 600 that may be used for rotating cryptographic keys in accordance with at least one of the various embodiments. After a start block, at block 602, in at least one of the various embodiments, a request to rotate one or more cryptographic keys may be received. In at least one of the various embodiments, a key rotation request may include a key name to identify the cryptographic key(s) for rotating.

At decision block 604, in at least one of the various embodiments, if the request to rotate the cryptographic key references a cryptographic key that may be eligible for key rotation, control may move to block 606. Otherwise, in at least one of the various embodiments, control may be returned to a calling process.

In at least one of the various embodiments, key parameters associated with a key name may include a designation and/or indication of whether cryptographic keys associated with the key name may be eligible for key rotation. In at least one of the various embodiments, such an indication may be implemented using one or more well-known software techniques, such as, flags, tables, labels, tags, or the like.

At block 606, in at least one of the various embodiments, the properties for a new cryptographic key may be determined. In at least one of the various embodiments, this may include retrieving key parameters from a previous stored configuration and/or a user-interface based inputs from a user. In at least one of the various embodiments, key parameters may be retrieved from a key array associated with the key name.

At block 608, in at least one of the various embodiments, the current cryptographic key may be encrypted using the system key. In at least one of the various embodiments, the encrypted current cryptographic key may be a transitional cryptographic key that may be temporarily stored in the non-volatile memory of a cryptographic device.

At block 610, in at least one of the various embodiments, the new cryptographic key may be generated based on the determined new key properties and associated with the key name that rotation request may be directed towards.

At block 612, in at least one of the various embodiments, the cryptographic application may begin the process of activating the new cryptographic key. In at least one of the various embodiments, if the activation for the new cryptographic key completes and the new cryptographic key is activated, the new cryptographic key may be set as the current cryptographic key for the given key name. In at least one of the various embodiments, the most recent new cryptographic key may assume the role as the current cryptographic key, so determined because it is the newest activated cryptographic key associated with the key name.

In at least one of the various embodiments, one or more checksums may be generated and associated with the new current cryptographic key. In at least one of the various embodiments, these one or more checksums may be generated based on determining a checksum value for some or all of information used to generate the cryptographic key, such as, keying data, key parameters, or the like.

At block 614, in at least one of the various embodiments, the transitional cryptographic key (e.g., the previous current cryptographic key) may be encrypted with the new current cryptographic key. In at least one of the various embodiments, the transitional cryptographic key (e.g., the previous cryptographic key) that was encrypted with the system key may be decrypted with the system key and encrypted with the new current cryptographic key. In at least one of the various embodiments, after encryption, the transitional cryptographic may be stored in the key array structure. In at least one of the various embodiments, if necessary a new checksum may be generated for the transitional cryptographic key and stored in the key array structure as well.

Figure 7:
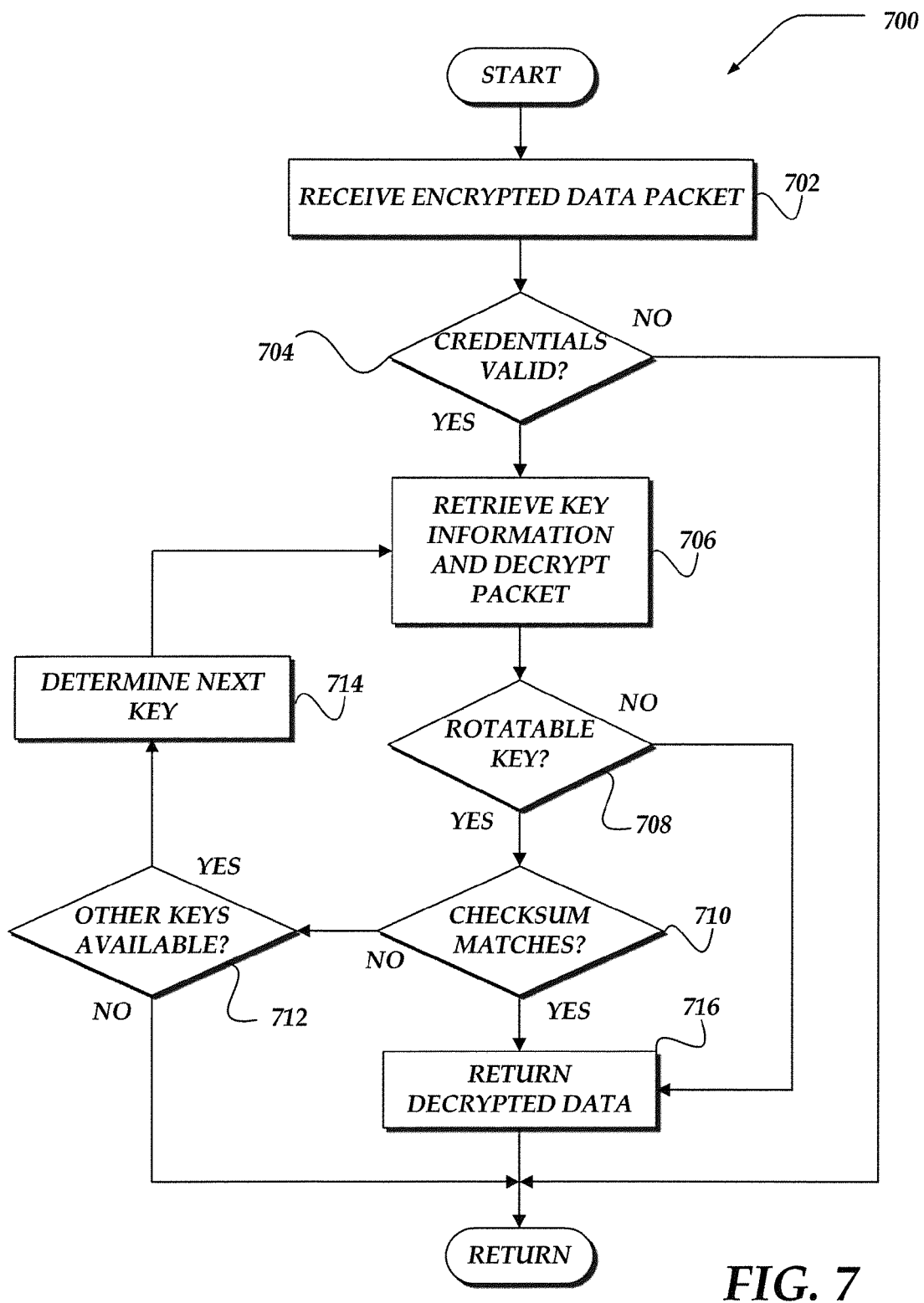
FIG. 7 shows a flowchart for a process that may be used for decrypting encrypted data packets in accordance with at least one of the various embodiments.

FIG. 7 shows a flowchart for process 700 that may be used for decrypting encrypted data packets in accordance with at least one of the various embodiments. After a start block, at block 702, in at least one of the various embodiments, one or more encrypted data packets may be received by a cryptographic device. In at least one of the various embodiments, encrypted data packets may be received with a key name that may be employed by the cryptographic application to determine the cryptographic keys to use.

At decision block 704, in at least one of the various embodiments, if the credentials (if any) that may be supplied and/or associated with the received encrypted data packet may be sufficiently valid, control may move block 706. Otherwise, in at least one of the various embodiments, the encrypted data packet may be ignored and control may be returned the calling process. In at least one of the various embodiments, one or more error messages indicating that the supplied credentials were insufficient may be logged, recorded, sent to the user, or the like.

At block 706, in at least one of the various embodiments, the cryptographic key information may be retrieved and employed to decrypt the packet. In at least one of the various embodiments, the cryptographic key information may be retrieved from a key array. In at least one of the various embodiments, retrieved key information may include, the cryptographic key, the checksum method associated with the cryptographic key, or the like.

In at least one of the various embodiments, the key information may be retrieved from an in-memory cache, or the like. Further, in at least one of the various embodiments, the encrypted data packet may be retained in its encrypted form in case more than one cryptographic key needs to be tried.

Also, in at least one of the various embodiments, this decryption process applies a decryption algorithm using the cryptographic key and the key parameters, not withstanding whether the cryptographic key used for decryption is the correct key.

Further, in at least one of the various embodiments, if a checksum corresponding to the cryptographic key is available, the cryptographic application may generate a new checksum for the cryptographic key and compare it with the supplied/previously-generated checksum. In at least one of the various embodiments, if the two checksum values are different, this may indicate that the cryptographic key is invalid/corrupt.

At decision block 708, in at least one of the various embodiments, if the cryptographic key is determined to be a rotatable cryptographic key, control may move to block decision block 710. Otherwise, in at least one of the various embodiments, control may move to block 716.

In at least one of the various embodiments, a cryptographic key may be determined to be rotatable based on whether the key information includes a value for identifying the cryptographic key (e.g., checksum value, associated checksum algorithm, or the like). Also, in at least one of the various embodiments, the key information may include explicit flags or indicators that designate that the cryptographic key may be rotatable.

At decision block 710, in at least one of the various embodiments, if there is checksum value included in the decrypted packet and if a locally generated checksum for the decrypted data matches the checksum included in the decrypted packet, control may move to block 716. Otherwise, in at least one of the various embodiments, control may move to decision block 712.

At decision block 712, in at least one of the various embodiments, if there may be other cryptographic keys associated with the given key name, control may move to block 714. Otherwise, in at least one of the various embodiments, control may be returned to a calling process.

At block 714, in at least one of the various embodiments, the cryptographic application may determine the next cryptographic key. In at least one of the various embodiments, the next cryptographic key may be identified using an index value that may be incremented. In other embodiments, the next cryptographic key may be determined by iterating through a data structure implemented using associative arrays, lists, arrays, or the like. In at least one of the various embodiments, if the next cryptographic key may be determined, control may move to block 706.

At block 716, in at least one of the various embodiments, the decrypted data may be returned to the user/client that made the decryption request. Next, in at least one of the various embodiments, control may be returned to a calling process.

Figure 8:
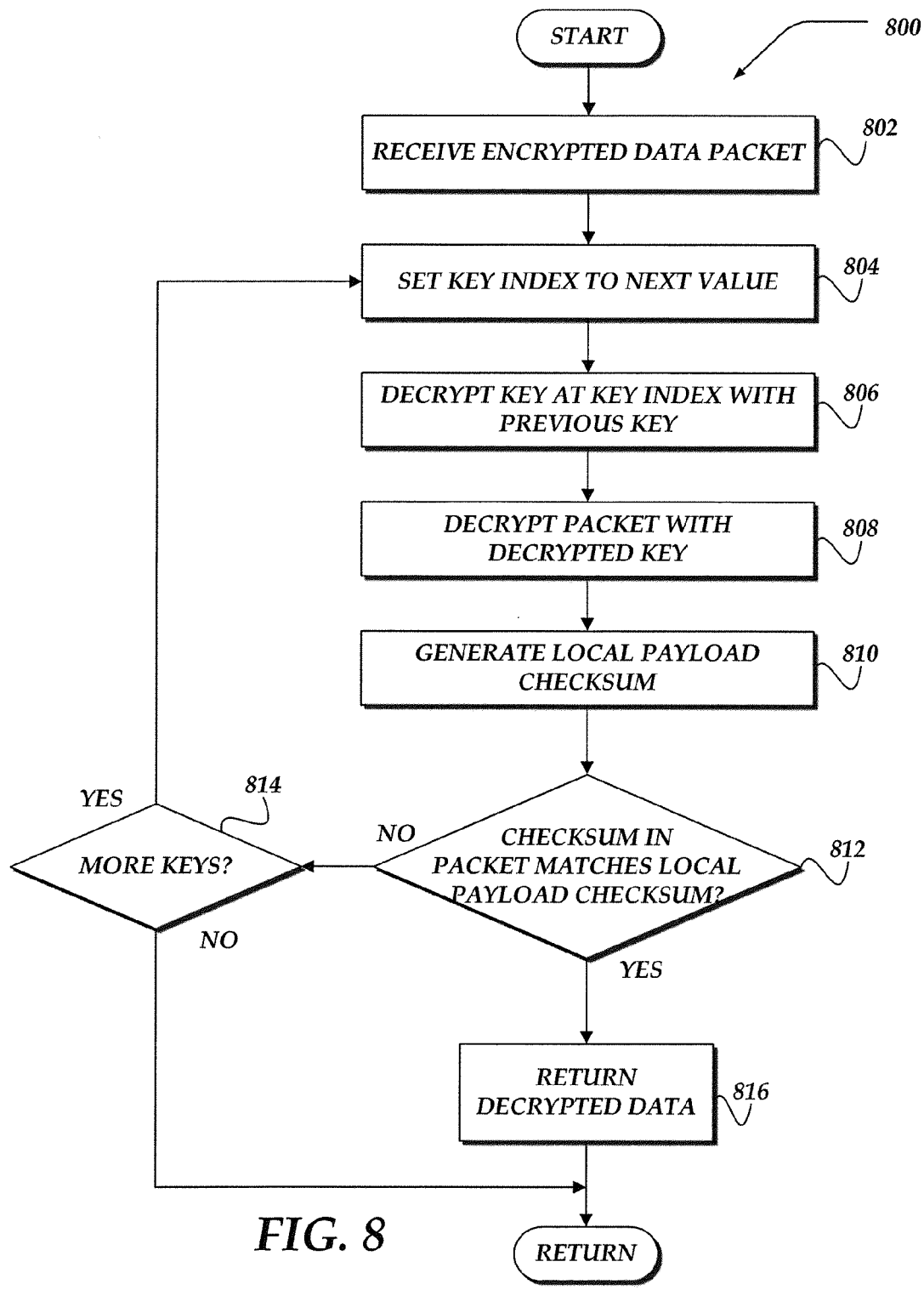
FIG. 8 shows a flowchart for a process that may be used for decrypting data with rotated cryptographic keys in accordance with at least one of the various embodiments.

FIG. 8 shows a flowchart for process 800 that may be used for decrypting data with rotated cryptographic keys in accordance with at least one of the various embodiments. After a start block, at block 802, in at least one of the various embodiments, an encrypted data packet may be received. In at least one of the various embodiments, the encrypted packet may be received along with a key name.

At block 804, in at least one of the various embodiments, set the key index to the next value. In at least one of the various embodiments, if it is the beginning of the process the next value may be set to enable the current cryptographic key for the key name to be selected.

In at least one of the various embodiments, the cryptographic application may be arranged to use a counter that may be used as an index into a key array for iterating through available cryptographic keys. Alternatively, in at least one of the various embodiments, other well-known methods for iterating over and/or through the collection of cryptographic keys may be employed, such as, iterating over a linked list, or the like.

At block 806, in at least one of the various embodiments, the cryptographic key pointed and/or referenced by the index may be decrypted with the previous cryptographic key. In at least one of the various embodiments, if the cryptographic key being used is the current cryptographic key, this decryption operation may be omitted because the current cryptographic key (e.g., the cryptographic key that is being used for current cryptographic operations) is unencrypted during its use as the current cryptographic key.

In at least one of the various embodiments, if the cryptographic key may have been previously decrypted, it may be retrieved from a cache data structure that may be stored in volatile memory. Also, if the cryptographic key, other than a current cryptographic key is absent from the volatile memory cache, the decrypted version of the cryptographic key may be stored in the cache for future use.

At block 808, in at least one of the various embodiments, the received packet may be decrypted with the decrypted cryptographic key.

At block 810, in at least one of the various embodiments, a local checksum value may be generated from the portion of the decrypted packet that includes the payload data (e.g., the decrypted packet data less the included checksum and/or other meta data that may be included with the received encrypted packet).

At decision block 812, in at least one of the various embodiments, if the checksum that was included with the decrypted packet matches the locally generated checksum, control may move to block 816. Otherwise, in at least one of the various embodiments, control may move to decision block 814.

In at least one of the various embodiments, if the checksum included in the received packet matches the locally generated checksum, this indicates that the cryptographic key currently referenced by the index was used to encrypt the received packet.

At block 816, in at least one of the various embodiments, the decrypted data may be returned to the client that submitted the encrypted data.

At decision block 814, in at least one of the various embodiments, if there may be more cryptographic keys to try, control may loop back to block 804. Otherwise, in at least one of the various embodiments, control may be returned to a calling process.

Figure 9:
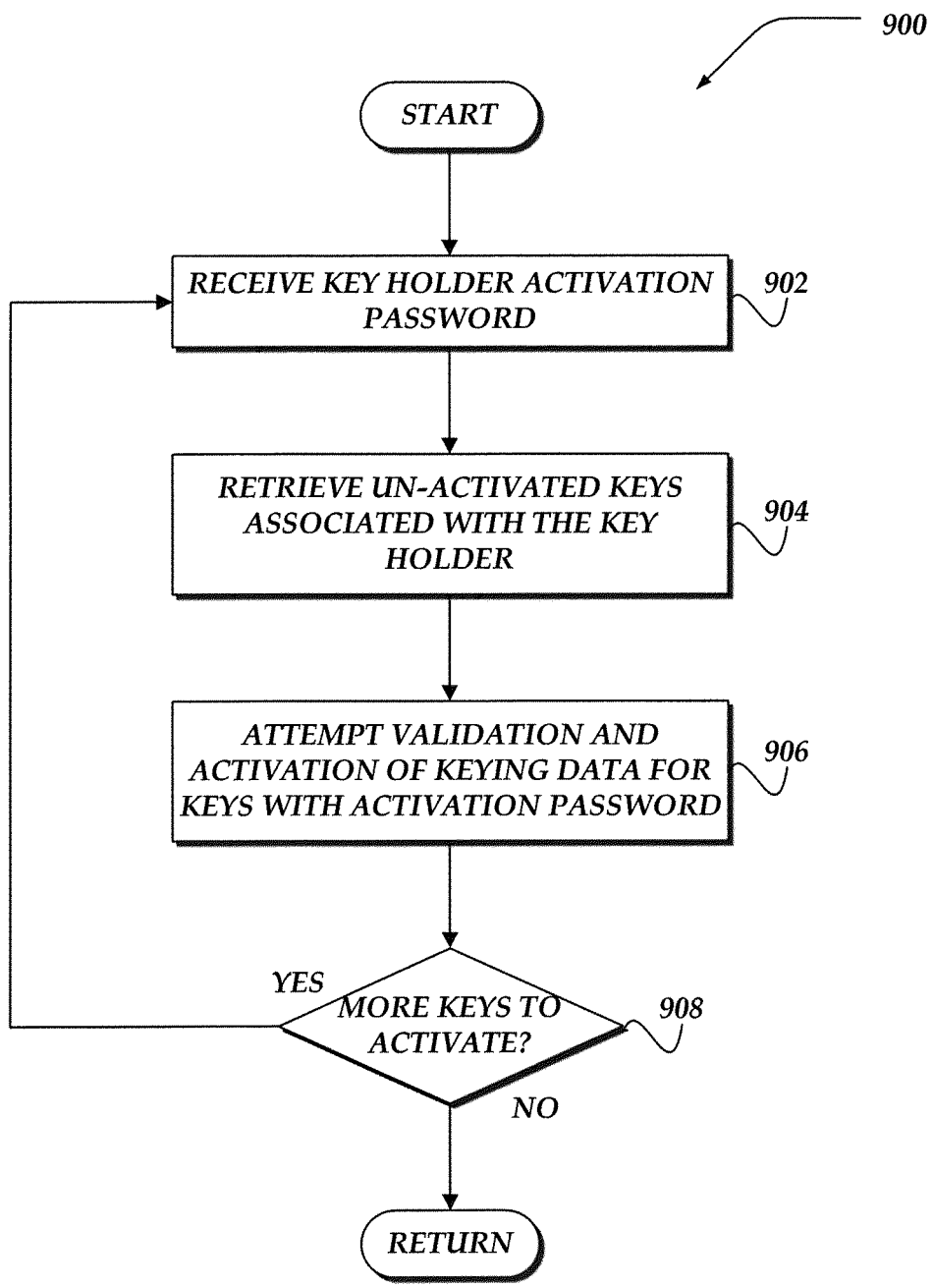
FIG. 9 shows a flowchart for a process that may be used for bulk activation of cryptographic keys in accordance with at least one of the various embodiments.

FIG. 9 shows a flowchart for process 900 that may be used for bulk activation of cryptographic keys in accordance with at least one of the various embodiments. After a start block, at block 902, in at least one of the various embodiments, a key holder activation password may be received.

At block 904, in at least one of the various embodiments, the un-activated cryptographic keys that may be associated with the key holder may be retrieved. In at least one of the various embodiments, the un-activated cryptographic keys may be retrieved from processor readable storage, such as, a local or remote database, data files, flash memory, cloud storage, or the like.

At block 906, in at least one of the various embodiments, the activation password may be employed to attempt to validate the keying data for each retrieved cryptographic key. In at least one of the various embodiments, if the received key holder activation password fails to activate a particular cryptographic key (e.g., the activation password is not correct), that particular cryptographic key may be skipped over without generating an error.

At decision block 908, in at least one of the various embodiments, if there may be more cryptographic keys associated with the key holder that may be eligible for activation, control may loop back to block 902. Otherwise, in at least one of the various embodiments, control may be returned to a calling process.

In at least one of the various embodiments, the system may generate a report to the key holder indicating the number of cryptographic keys that may have been validated and/or may have failed to validate.

Figure 10:
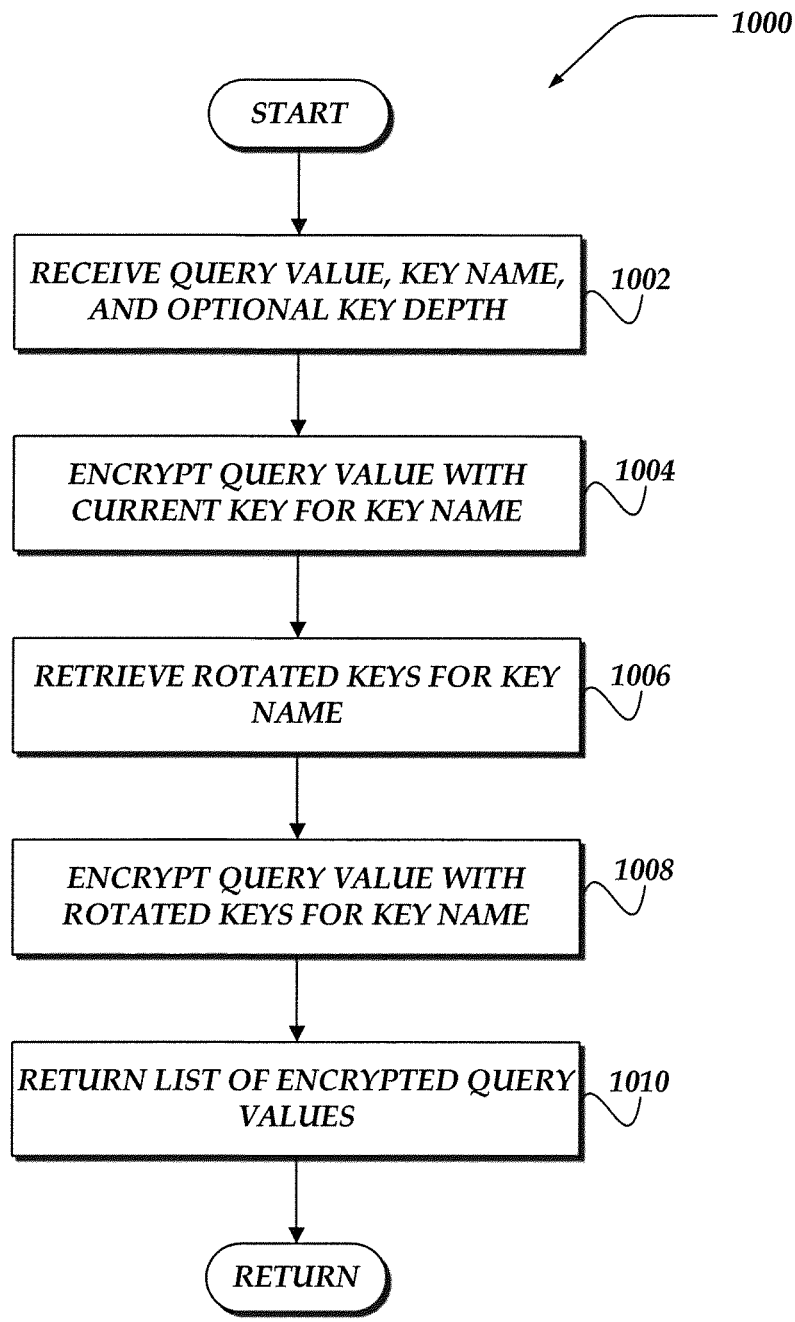
FIG. 10 shows a flowchart for a process that may be used for processing search query values in accordance with at least one of the various embodiments.

FIG. 10 shows a flowchart for process 1000 that may be used for processing search query values in accordance with at least one of the various embodiments.

In at least one of the various embodiments, in some user applications, sensitive data, such as, credit card numbers, social security numbers, passwords, or the like, may be encrypted before storing in a database, flat files, or the like. In some embodiments, this sensitive data may be used to lookup and/or retrieve other data that may be associated with the sensitive data. For example, an application may store encrypted credit card numbers in a database and associate other user/customer records with the stored encrypted credit card numbers. Storing the sensitive data in an encrypted form may reduce the risk of the sensitive data being exploited if control over the data is lost (e.g., data security breach).

For example, in at least one of the various embodiments, a database table may include a column to store encrypted credit card numbers. An application may use a cryptographic application to encrypt the credit card number before storing it in the database. Later, if looking up the same credit card in the database, the application may receive the unencrypted credit card number from a user; employ the cryptographic application to encrypt the credit card number; and employ the encrypted credit card number to search for the previously stored encrypted credit card. If before the sending the credit card number to the database it is encrypted using the same cryptographic key, the search should match the correct credit card value. However, if a key rotation policy is in place and the cryptographic keys were rotated subsequent to the encryption of the credit card number, the encrypted credit card values will not match because they will have been encrypted using different cryptographic keys. Accordingly, in at least one of the various embodiments, if key rotation is being employed, the cryptographic application may lookup up some or all of the rotated cryptographic keys associated with a key name and generate encrypted values corresponding to each cryptographic key. After a start, at block 1002, in at least one of the various embodiments, a query value, such as an unencrypted credit card number, and key name with an optional key depth value may be received from a client and/or user.

In at least one of the various embodiments, the key depth may be employed to determine how many previously rotated cryptographic keys to include in this process. In at least one of the various embodiments, the key depth may be arranged to map to one or more rotated cryptographic keys that may be associated with a key name, such as an integer representing the number of rotation generations to include in the process. Also, in at least one of the various embodiments, the key depth may be a range of integers, a time value and/or time range corresponding to the age of the rotated cryptographic key, a set of integers and/or time values, or the like.

In at least one of the various embodiments, if the key depth is absent, the cryptographic application may retrieve each rotated cryptographic key associated with the provided key name.

At block 1004, in at least one of the various embodiments, the query value may be encrypted using the current cryptographic key associated with the key name.

In at least one of the various embodiments, the key depth may indicate that the current cryptographic key may be excluded from the process. For example, in at least one of the various embodiments, a key depth of '3-5' may produces results that correspond to cryptographic keys of the third, fourth, and fifth rotation generations for a given key name.

In at least one of the various embodiments, even if the current cryptographic key may be excluded from producing encrypted data because of the key depth, it may be employed to decrypt the rotated cryptographic keys as necessary.

At block 1006, in at least one of the various embodiments, the rotated cryptographic keys associated with the given key name may be retrieved.

At block 1008, in at least one of the various embodiments, the query value may be encrypted with each of the rotated cryptographic keys associated with the given key name. In at least one of the various embodiments, this may produce multiple encrypted values that correspond to each of the relevant rotated encrypted keys.

At block 1010, in at least one of the various embodiments, the list of encrypted query values may be returned to the requesting clients and/or user.

It will be understood that figures, and combinations of actions in the flowchart-like illustrations, can be implemented by computer program instructions. These program instructions may be provided to a processor to produce a machine, such that the instructions executing on the processor create a means for implementing the actions specified in the flowchart blocks. The computer program instructions may be executed by a processor to cause a series of operational actions to be performed by the processor to produce a computer implemented process for implementing the actions specified in the flowchart block or blocks. These program instructions may be stored on some type of machine readable storage media, such as processor readable non-transitive storage media, or the like.

The invention claimed is:

1. A method for cryptographic processing of data using a network device that is operative to perform actions, comprising:

responsive to receiving a request to rotate at least one current key, performing further actions, including:

generating at least one transitional key by encrypting the at least one current key using at least one system key;

generating at least one new key based on at least one determined key parameter;

activating the at least one new key based on provided data provided by from at least two key holders, wherein the provided data includes at least a password provided by each of the at least two key holders and at least portion of keying data provided by the at least each two key holders, wherein the at least portion of keying data is encrypted and is based on at least one of seeding data or entropy data, and wherein the at least portion of keying data is decrypted with the password provided by the at least two key holders;
generating at least one new current key based on the at least one activated key, wherein the at least one new current key is stored at least in volatile memory; and
encrypting the at least one transitional key using the at least one new current key and storing it in at least one key array;
receiving at least one encrypted client data from at least one client device;
decrypting the at least one encrypted client data to form decrypted client data, wherein the decrypted client data includes at least one identifier, wherein the at least one identifier identifies at least one key within the key array;
retrieving at least one other key from the at least one key array based on at least one key array index;
determining if the at least one identifier identifies the at least one other key;
sending at least a portion of the decrypted client data to the at least one client device upon determining that the at least one identifier identifies the at least one other key;
advancing the at least one key array index to the next available key in the at least one key array upon determining that the at least one identifier is unable to identify the at least one other key.

2. The method of claim 1, wherein activating the at least one new key further comprises:
receiving the at least portion of keying data from the at least one two key holders, wherein the at least one two key holders activates the at least portion of keying data using at least one password that corresponds to the at least portion of keying data.

3. The method of claim 1, wherein storing the at least one transitional key in the at least one key array further comprises, linking a previous current key with the at least one new current key.

4. The method of claim 1, further comprising:
receiving the at least one password from the at least one two key holders;
retrieving each un-activated at least one new key that is associated with the at least one two key holders; and
validating the at least portion of keying data associated with each un-activated at least one new key using the at least one password.

5. The method claim 1, further comprising:
receiving at least one request from the at least one client device that includes at least one query value and at least one key name;
retrieving the at least one key within the key array, wherein the at least one retrieved key is associated with the at least one key name;
encrypting the at least one query value to generate at least one encrypted query value, wherein the at least one encrypted query value is generated for each retrieved at least one key; and
returning the at least one encrypted query value to the at least one client device.

6. The method of claim 1, further comprising, storing the at least one current key and the at least one rotated key in a cache that is in the volatile memory.

7. The method of claim 1, further comprising:
generating a key name that is associated with the at least one current key, the determined key parameter, and the data provided by the at least one two key holders.

8. A network device for cryptographic processing of data over a network, comprising:
a transceiver component for communicating over a network;
a memory component for storing instructions and data; and
a processor component microprocessor that executes instructions that enable actions, including:
responsive to receiving a request to rotate at least one current key, performing further actions, including:
generating at least one transitional key by encrypting the at least one current key using at least one system key;
generating at least one new key based on at least one determined key parameter;
activating the at least one new key based on provided data provided by from at least two key holders, wherein the provided data includes at least a password provided by each of the at least two key holders and a portion of keying data provided by the at least each two key holders, wherein the portion of keying data is encrypted and is based on at least one of seeding data or entropy data, and wherein the at least portion of keying data is decrypted with the password provided by the at least two key holders;
generating at least one new current key based on the at least one activated key, wherein the at least one new current key is stored at least in volatile memory; and
encrypting the at least one transitional key using the at least one new current key and storing it in at least one key array;
receiving at least one encrypted client data from at least one client device;
decrypting the at least one encrypted client data to form decrypted client data, wherein the decrypted client data includes at least one identifier, wherein the at least one identifier identifies at least one key within the key array;
retrieving at least one other key from the at least one key array based on at least one key array index;
determining if the at least one identifier identifies the at least one other key;
sending at least a portion of the decrypted client data to the at least one client device upon determining that the at least one identifier identifies the at least one other key;
advancing the at least one key array index to the next available key in the at least one key array upon determining that the at least one identifier is unable to identify the at least one other key.

9. The network device of claim 8, wherein activating the at least one new key further comprises, receiving the at least portion of keying data from the at least one two key holders, wherein the at least one two key holders activates the at least portion of keying data using at least one password that corresponds to the at least portion of keying data.

10. The network device of claim 8, wherein storing the at least one transitional key in the at least one key array further comprises, linking a previous current key with the at least one new current key.

11. The network device of claim 8, wherein the instructions further comprise:
receiving the at least one password from the at least one two key holders;
retrieving each un-activated at least one new key that is associated with the at least one two key holders; and
validating the at least portion of keying data associated with each un-activated at least one new key using the at least one password.

12. The network device of claim 8, wherein the instructions further comprise:

receiving at least one request from the at least one client device that includes at least one query value and at least one key name;

retrieving the at least one key within the key array, wherein the at least one retrieved key is associated with the at least one key name;

encrypting the at least one query value to generate at least one encrypted query value, wherein the at least one encrypted query value is generated for each retrieved at least one key; and returning the at least one encrypted query value to the at least one client device.

13. The network device of claim 8, wherein the instructions further comprise:

storing the at least one current key and the at least one rotated key in a cache that is in the volatile memory.

14. The network device of claim 8, wherein the instructions further comprise:

generating a key name that is associated with the at least one current key, the determined key parameter, and the data provided by the at least one key holder.

15. A processor non-transitory computer readable non-transitive storage media that includes instructions for cryptographic processing of data using a network device that includes a plurality of components and is operative to execute the instructions to perform actions, comprising:

responsive to receiving a request to rotate at least one current key, performing further actions, including:

generating at least one transitional key by encrypting at least one current key using at least one system key;

generating at least one new key based on at least one determined key parameter;

activating the at least one new key based on provided data provided by from at least two key holders, wherein the provided data includes at least a password provided by each of the at least two key holders and a portion of keying data provided by the at least each two key holders, wherein the portion of keying data is encrypted and is based on at least one of seeding data or entropy data, and wherein the at least portion of keying data is decrypted with the password provided by the at least two key holders;

generating at least one new current key based on the at least one activated key, wherein the at least one new current key is stored at least in volatile memory; and encrypting the at least one transitional key using the at least one new current key and storing it in at least one key array;

receiving at least one encrypted client data from at least one client device;

decrypting the at least one encrypted client data to form decrypted client data, wherein the decrypted client data includes at least one identifier, wherein the at least one identifier identifies at least one key within the key array;

retrieving at least one other key from the at least one key array based on at least one key array index;

determining if the at least one identifier identifies the at least one other key;

sending at least a portion of the decrypted client data to the at least one client device upon determining that the at least one identifier identifies the at least one other key;

advancing the at least one key array index to the next available key in the at least one key array upon determining that the at least one identifier is unable to identify the at least one other key.

16. The media of claim 15, wherein activating the at least one new key further comprises, receiving the at least portion of keying data from the at least one two key holders, wherein the at least one two key holders activates the at least portion of keying data using at least one password that corresponds to the at least one portion of keying data.

17. The media of claim 15, wherein storing the at least one transitional key in the at least one key array further comprises, linking a previous current key with the at least one new current key.

18. The media of claim 15, wherein the instructions further comprise:

receiving the at least one password from the at least one two key holders;

retrieving each un-activated at least one new key that is associated with the at least one two key holders; and validating the at least portion of keying data associated with each un-activated at least one new key using the at least one password.

19. The media of claim 15, wherein the instructions further comprise:

receiving at least one request from the at least one client device that includes at least one query value and at least one key name;

retrieving the at least one key within the key array, wherein the at least one retrieved key is associated with the at least one key name;

encrypting the at least one query value to generate at least one encrypted query value, wherein the at least one encrypted query value is generated for each retrieved at least one key; and returning the at least one encrypted query value to the at least one client device.

20. The media of claim 15, wherein the instructions further comprise:

storing the at least one current key and the at least one rotated key in a cache that is in the volatile memory.

21. A system arranged for cryptographic processing of data, comprising:

a server device, including:

a transceiver device that is operative to communicate over the network;

a memory device that is operative to store at least instructions; and a processor device first microprocessor that is operative to execute that executes a first set of instructions that enable actions, including:

responsive to receiving a request to rotate at least one current key, enabling further actions, including:

generating at least one transitional key by encrypting at least one current key using at least one system key;

generating at least one new key based on at least one determined key parameter;

activating the at least one new key based on provided data provided by from at least two key holders, wherein the provided data includes at least a password provided by each of the at least two key holders and a portion of keying data provided by the at least each two key holders, wherein the portion of keying data is encrypted and is based on at least one of seeding data or entropy data, and wherein the at least portion of keying data is decrypted with the password provided by the at least two key holders;

generating at least one new current key based on the at least one activated key, wherein the at least one new current key is stored at least in volatile memory; and encrypting the at least one transitional key using the at least one new current key and storing it in at least one key array;

receiving at least one encrypted client data from at least one client device;

decrypting the at least one encrypted client data to form decrypted client data, wherein the decrypted client data includes at least one identifier, wherein the at least one identifier identifies at least one key within the key array;

retrieving at least one other key from the at least one key array based on at least one key array index;

determining if the at least one identifier identifies the at least one other key;

sending at least a portion of the decrypted client data to the at least one client device upon determining that the at least one identifier identifies the at least one other key;

advancing the at least one key array index to the next available key in the at least one key array upon determining that the at least one identifier is unable to identify the at least one other key; and wherein the client device, comprises:

a transceiver device that is operative to communicate over the network;

a memory device that is operative to store at least instructions; and a second processor device microprocessor that is operative to executes a second set of instructions that enable actions, including:

at least one of providing the at least portion of the keying data provided by the at least one two key holders, or providing the request to rotate the at least one current key.

22. The system of claim 21, wherein activating the at least one new key further comprises:

receiving the at least portion of keying data from the at least one two key holders, wherein the at least one two key holders activates the at least portion of keying data using at least one password that corresponds to the at least portion of keying data.

23. The system of claim 21, wherein storing the at least one transitional key in the at least one key array further comprises:

linking a previous current key with the at least one new current key.

24. The system of claim 21, wherein the first set of instructions further comprises:

receiving the at least one password from the at least one two key holders;

retrieving each un-activated at least one new key that is associated with the at least one two key holders; and validating the at least portion of keying data associated with each un-activated at least one new key using the at least one password.

25. The system of claim 21, wherein the first set of instructions further comprises:

receiving at least one request from the at least one client device that includes at least one query value and at least one key name;

retrieving the at least one key within the key array, wherein the at least one retrieved key is associated with the at least one key name;

encrypting the at least one query value to generate at least one encrypted query value, wherein the at least one encrypted query value is generated for each retrieved at least one key; and returning the at least one encrypted query value to the at least one client device.

26. The system of claim 21, wherein the first set of instructions further comprises:

storing the at least one current key and the at least one rotated key in a cache that is in the volatile memory.

\* \* \* \* \*